United States Patent
Almeida Junior

(10) Patent No.: US 10,363,498 B2
(45) Date of Patent: Jul. 30, 2019

(54) SYSTEM FOR BIOLOGICAL AEROBIC ACTIVATED SLUDGE PROCESS WITH HYDRODYNAMIC SOLID SEPARATION

(71) Applicant: Ronaldo Leite Almeida Junior, Campinas (BR)

(72) Inventor: Ronaldo Leite Almeida Junior, Campinas (BR)

( * ) Notice: Subject to any disclaimer, the term of this patent is extended or adjusted under 35 U.S.C. 154(b) by 0 days.

(21) Appl. No.: 15/759,101

(22) PCT Filed: Sep. 8, 2016

(86) PCT No.: PCT/BR2016/050225
§ 371 (c)(1),
(2) Date: Mar. 9, 2018

(87) PCT Pub. No.: WO2017/041157
PCT Pub. Date: Mar. 16, 2017

(65) Prior Publication Data
US 2018/0280836 A1    Oct. 4, 2018

(30) Foreign Application Priority Data

Sep. 9, 2015   (BR) .......................... 102015022083
Sep. 6, 2016   (BR) .......................... 102016020627

(51) Int. Cl.
| | |
|---|---|
| *B01D 21/00* | (2006.01) |
| *C02F 3/22* | (2006.01) |
| *B01D 21/24* | (2006.01) |
| *C02F 3/12* | (2006.01) |
| *C02F 9/00* | (2006.01) |
| *B01D 21/04* | (2006.01) |

(52) U.S. Cl.
CPC ..... *B01D 21/0045* (2013.01); *B01D 21/0069* (2013.01); *B01D 21/2494* (2013.01); *C02F 3/1226* (2013.01); *C02F 3/22* (2013.01); *C02F 9/005* (2013.01); *B01D 21/04* (2013.01); *B01D 21/2477* (2013.01); *Y02W 10/15* (2015.05)

(58) Field of Classification Search
None
See application file for complete search history.

(56) References Cited

U.S. PATENT DOCUMENTS

2011/0168021 A1*  7/2011  Vellinga ............. B01D 21/0045
                                                               95/259

FOREIGN PATENT DOCUMENTS

| EP | 0048630 A1 * | 3/1982 | ............. C02F 3/121 |
| GB | 1375458 A  * | 11/1974 | ......... B01D 21/2488 |
| WO | WO-9632177 A1 * | 10/1996 | ......... B01D 19/0042 |

* cited by examiner

*Primary Examiner* — Chester T Barry
(74) *Attorney, Agent, or Firm* — B. Aaron Schulman, Esq.; Stites & Harbison, PLLC

(57) ABSTRACT

A method and device used for treating effluents by the biological aerobic activated sludge process with hydrodynamic separation, sludge collection, internal sludge recirculation and atmospheric air or oxygen dissolution functions implemented by a device that accumulates the functions of solids retention and gas dissolution in the biological reactor, increasing the hydraulic load capacity of the secondary settler, as well as the load absorption capacity of the biological reactor, thus almost doubling the treatment capacity in relation to a conventional activated sludge process.

9 Claims, 5 Drawing Sheets

SYSTEM FOR BIOLOGICAL AEROBIC ACTIVATED SLUDGE PROCESS WITH HYDRODYNAMIC SOLID SEPARATION

FIELD OF THE INVENTION

The present application relates generally to the field of aerobic biological systems for the treatment of effluents with organic loads, and in particular to a novel device and corresponding adjustments to a conventional activated sludge process.

BACKGROUND

As currently in operation, the aerobic biological systems for the treatment of effluents with organic loads, called the activated sludge process, use two steps that perform different operations: there is a first, "Biological Reactor Step", and a second "Gravitational Sedimentation of Solids Step".

The first step in the activated sludge process is the biological reactor step, which occurs inside a biological reactor, which operates with aerobic bacteria, mainly containing means for the dissolution of the oxygen gas that may come from atmospheric air, or oxygen-containing gas in concentrations higher than the atmosphere, dissolved by equipment called aerators or oxygenators. The equipment used for dissolving gases also provides mixing energy that must be used to maintain the solids in suspension in the biological reactor. Among the solids are the microorganisms responsible for the absorption and processing of the organic load or nutrient load, resulting in its removal from the liquid medium.

In an activated sludge process system, the microorganisms used are aerobic, and the process requires the application of equipment that dissolves the oxygen gas in the liquid known as mixed liquor, which is the liquid to be treated plus the mass of microorganisms present in the biological reactor.

Additionally, in many chemical/fermentative processes where the dissolution of the air and/or oxygen is required, the overall rate of production of the process is nearly always limited by the transfer of oxygen to the liquid. This limitation is the object of many searches having an aim of improving such transfer rates.

The equipment used to promote the oxygenation are called aerators, blowers, diffusers or oxygenators. A variety of aeration systems are used in wastewater treatment processes.

Two basic methods of aerating wastewater are:
a. Dissolving air or oxygen in wastewater with submerged diffusers or other aeration devices; and
b. Mechanical agitation of wastewater that promotes the dissolution of atmospheric oxygen.

The aeration devices may be classified in a variety of ways, such as:
a. Suction devices: Consisting of a hydraulic propellant that pumps a flow of liquid mass which, by the venturi effect, sucks the air from the atmosphere and discharges the air/water mixture below the surface of the water. These devices have low oxygen transfer efficiency.
b. Static tubes: Consist of one or more tubes, mounted at the bottom of the biological reactor, which receive air from blowers that is dissolved in the liquid through holes in the tubes, aerating and promoting the mixture, however they have a low oxygen transfer.
c. Disc diffusers: Consist of rigid ceramic discs or flexible porous membranes mounted on air distribution tubes near the bottom of the biological reactor tank. They receive air from blowers to be dissolved in the liquid through the pores of the discs, which dispense bubbles of air into the liquid. The energy for mixing in this process is provided by the blown air transformed into bubbles released in the liquid, in an ascending movement.
d. Venturi aerators: Applied to aeration equipment, the venturi is responsible for sucking the air and promoting its mixture into the liquid in the form of small bubbles. A Venturi aerator is composed of a nozzle, followed by a constant-diameter conduit (throat) and then a gradually divergent cone. The throat area, being small, results in a high velocity of the liquid, followed by a corresponding decrease in static pressure which allows the use of the Venturi as a gas suction device. The use of a Venturi to suck gases uses as a criterion the obtaining of a pressure inferior to the atmospheric one. The existing holes in the throat wall provide suctioning of air or other gas due to the pressure differential.
e. Ejectors: These are devices that use the kinetic energy of a high velocity liquid jet to conduct, disperse and dissolve gases in liquids. The "jet aeration" aeration system, which is composed of hydraulic pumps for recirculation of mixed liquor from the biological reactor, falls into this category.

The second step in the activated sludge process is the gravitational sedimentation of solids step, which operates using decanters or gravitational settlers, which consist of compartments of low hydraulic turbulence that allow the microorganisms formed in the biological reactor to be separated via sedimentation at the bottom, and collected with or without the help of bottom scrapers which direct the sludge to a point of collection, where it are sucked up, the majority being recirculated to the biological reactor and part discarded for densification, dewatering and disposal.

The objective of recirculating the separated solids from the gravitational settler to the biological reactor is to increase the concentration of microorganisms in the biological reactor and thus increase the load removing capacity for the available biological reactor volume. In the conventional activated sludge process, the concentration of suspended solids in the biological reactor is around 2000 mg/L to 4000 mg/L. At these concentrations, the detention period in the gravitational settler process characteristically takes around 3 to 5 hours. In this compartment, the dissolved oxygen concentration is practically zero. This type of environment is called an anoxic environment. In such an environment, it is not recommended that an aerobic bacterium remain for more than 5 hours. To sediment sludge concentrations above 4000 mg/L, periods of decantation detention above 5 hours would be necessary, this period thus being the limiting factor of the concentration of microorganisms in conventional activated sludge projects.

The process of treatment of effluents by conventional activated sludge processes can therefore be defined as the hydraulic interconnection of two compartments, operating in two different steps, the first step, in a compartment called a biological reactor, aiming to develop a culture of microorganisms capable of absorbing and digesting the dissolved material in a mass of water, and in the second step, solid separation occurring within another compartment generally composed of gravitational settlers capable of separating the microorganisms that are in the solid phase. The liquid phase is the liquid contained in the aeration tank, free from the microorganism mass. While the solids are collected at the bottom of the settler, the liquid free of the microorganism mass is discarded through surface spillways.

The treated effluent is the decanted effluent, discharged by the spillways.

The mass of pollutants is absorbed by the microorganism and discarded as biological sludge. What is needed, therefore, is a system that makes it possible to increase the overall treatment capacity over conventional activated sludge processes.

SUMMARY OF THE INVENTION

The present application seeks to provide a device and an aerobic biological process to treat effluents with organic matter and nutrients such as organic nitrogen and organic phosphorus. The process is of environmental relevance, since it is intended to reduce the maximum pollution of water discarded to the water bodies like rivers, seas and groundwater, considering the state of the art. It is also relevant from the point of view of reducing volumes of works, investment, and operational costs of the aerobic treatment process of effluents.

DETAILED DESCRIPTION OF THE INVENTION

The invention will be described for the purposes of illustration only in connection with certain embodiments, however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
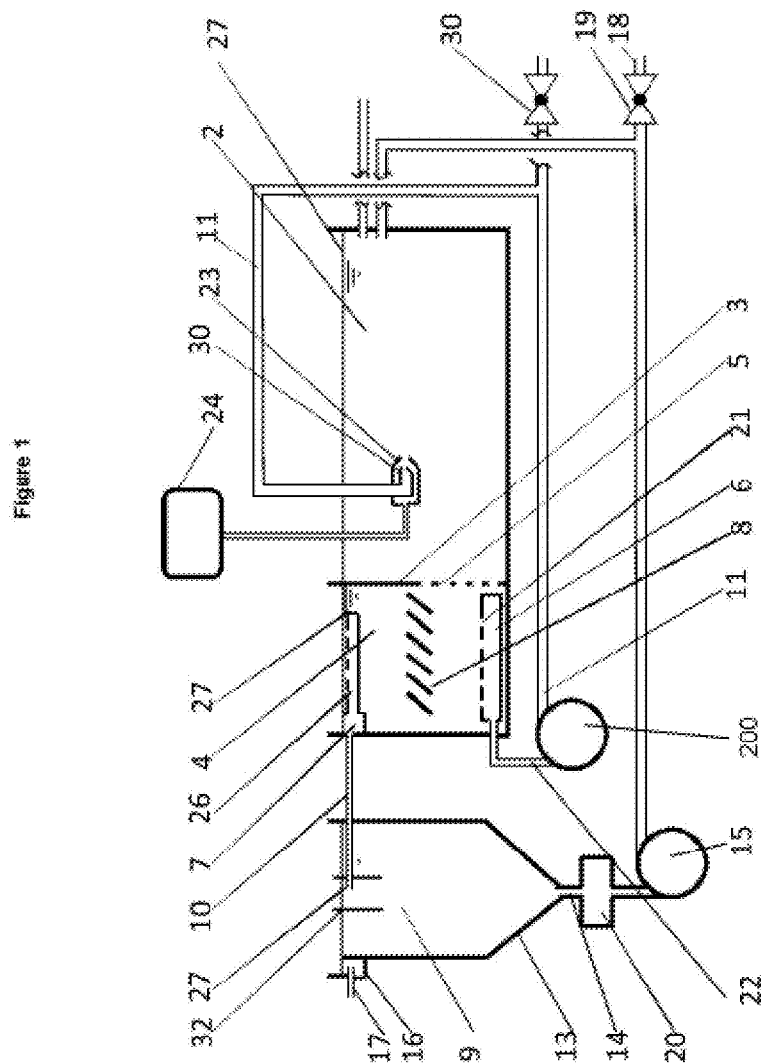
FIG. 1 is a schematic view of the system used in the biological aerobic activated sludge process with hydrodynamic solid separation of the present Application.

FIG. 1 shows a diagram of the system used for the biological aerobic activated sludge process with hydrodynamic separation. The process of the present invention differs from the conventional activated sludge process because it contains 3 steps: a biological reactor step, a hydrodynamic separation step, and a gravitational sedimentation of solids or secondary decanting step.

The process of the present invention has the same objectives as conventional activated sludge treatment, however using a smaller volume of tanks, since in the present process, the sum of the volume of the hydrodynamic separator (4) added to the volume of the biological reactor (2) can become half of the volume of the biological reactor used in conventional activated sludge processes.

The present invention includes a piece of equipment called a hydrodynamic separator of solids, the invention of which was necessary for the operation of the present biological activated sludge process with hydrodynamic solid separation. This hydrodynamic separator equipment is also an object of the present Application.

The aerobic biological process of activated sludge with hydrodynamic solid consists of the insertion of an equipment or compartment called a hydrodynamic solid separator (4) into the conventional activated sludge process, the equipment being inserted downstream of the biological reactor (2) and upstream of the gravitational settler (9).

The activated sludge process with hydrodynamic solid separation comprises the following steps:

Firstly, the biological reaction step. The biological reaction step, where the contact of the effluent occurs with the microorganisms and dissolved oxygen, absorption and metabolization of the dissolved pollutants, uses the following devices:

a.1—A biological reactor (2) which comprises a tank or container that can be made of concrete, steel, fiberglass, etc.

a.2—A system for the dissolution of air or oxygen comprising equipment for the dissolution of gases in the liquid (called jet aeration), formed by:

a.2.1—a liquid ejector (30) for the dissolution of gas in the liquid, consisting of a device which generates hydraulic turbulence due to increasing the velocity of the liquid per nozzle.

a.2.2—A gas ejector (23) comprising a device that receives the gas and liquid under pressure generating the partitioning of the gas, producing gas microbubbles, discharged into the mixed liquor present in biological reactor (2), dissolving oxygen in the liquid by diffusion, whose efficiency depends on the gas-liquid contact section and the difference in the saturation concentration of the oxygen present in the gas (depends on the partial pressure of the oxygen) and on the oxygen concentration already dissolved in the liquid which will receive the gas dissolution.

a.2.3—A gas generator (24) comprising an atmospheric air blower or a gas generator with oxygen concentrations greater than the atmospheric, or in an oxygen-containing cryogenic tank stored in liquid form and converted into gas by an atmospheric vaporizer to supply the dissolution system.

The next step is the Hydrodynamic solid separation step.

The hydrodynamic separation of solids step is performed in the hydrodynamic collector of solids device (4), which is comprised of several elements.

b.1—A collector housing (3) comprising a structure made of concrete, steel or fiberglass, etc., which delimits the interior of the hydrodynamic separator and serves for the installation of other systems of the hydrodynamic separator. The effluent to the hydrodynamic separator arises from the biological reactor (2) which passes through the collector housing (3), through the holes (5) in the housing.

b.2—A decanted liquor collector system (7) serving to perform the collection of mixed decanted liquor, with the aim of hydraulically dragging the mass of suspended solids as little as possible.

b.3—A mixed liquor collector system with sedimented solids works to perform mixed liquor collection with sedimented solids, with the aim of collecting the maximum possible mass of solids, out of the suspended solids in the hydrodynamic separator (4). This system has a sludge collector (6) comprised of several tubes with sludge collection holes (21) which are distributed throughout the cross-section of the bottom of the hydrodynamic separator (4).

b.4—A laminar sedimentation system of solids which comprises laminar plates (8), which induce the reduction of the hydraulic radius in the region of the plates, reducing the hydraulic turbulence and increasing the sedimentation capacity of solids.

b.5—A centrifugal pump (20) comprising an element which performs the suction of the mixed liquor from the decanted solids collecting system through the pipeline for the discharge of sedimented solids containing liquid, (22) and then further discharges through the pipeline (11) for the biological reactor (2), passing through the system of dissolution of atmospheric air or oxygen.

Next is the gravitational sedimentation of solids step for those solids not yet separated, occurring in the gravitational settler The step of gravitational sedimentation of solids (9) comprises the following devices:

c.1—A liquor distribution system arising from the hydrodynamic separator comprising a tubular device (32) which receives the flow rate via a pipeline (10) from the decanted mixed liquor collector system, to reduce the velocity of the jet and distribute the inlet flow in a downward direction.

c.2—A bottom sludge collector or scraper system comprising a sloping wall (13), having a maximum angle of 60° with the opposite wall, where the sludge sedimented in it slides by gravity to the point of collection, or, for cases of large settlers, consists of a bottom scraper machine scraping the sludge to the center of the gravitational settler (9) to be transferred to the sludge pit.

c.3—A sludge storage and pumping system comprising a sludge storage compartment interconnected to the bottom of the gravitational settler (9) through the a pipeline (14) and equipped with a centrifugal pump (15) to collect the sludge and recycle it back to the biological reactor (2), with a portion of the sludge discarded through another pipeline (18) whose flow rate is controlled by a valve (19).

c.4—A decanting water collection system comprising a spillway (16) and a decanted and treated water disposal pipeline (17).

Process Operation

The aerobic biological process of activated sludge separation with hydrodynamic solid separation comprises three steps: Biological Reaction, Hydrodynamic Separation of Solids and Gravitational Sedimentation of Solids.

Among the three compartments of the process, the flow of mixed liquor occurs by gravity, with a lowering of the liquid level (27) from upstream to downstream.

The polluted effluent enters the biological reaction step so that the organic matter dissolved in it is absorbed by a biota of heterotrophic aerobic microorganisms and ammoniacal nitrogen is biologically oxidized to nitrate by autotrophic bacteria. The biota is maintained at a constant concentration in the biological reactor through the sludge discharge flow rate control, both by discarding into the gravitational settler and by discarding into the hydrodynamic separator (4).

In the biological reactor, an oxygen dissolution system is installed which, in addition to dissolving the oxygen necessary for the biological development of the microorganisms responsible for the treatment, also supplies hydraulic power to the biological reactor (2) for the necessary maintenance of microorganisms in suspension.

The process of the present Application operates with two cycles of sludge recycling, one arising from the hydrodynamic separator (4) and another from the gravitational solid settler (9).

The microorganisms present in the biological reactor have exponential growth kinetics aided by said sludge recycles.

The double recycling of the sludge is a significant difference in relation to the conventional activated sludge process, which counts on only one cycle of sedimented sludge recycling, coming from the solid settler (9).

In the biological reaction step, the capacity for removal of dissolved organic matter is directly proportional to the concentration of microorganisms, that is, the higher the concentration of microorganisms, the greater the load removing capacity of the overall treatment.

After the biota has absorbed the dissolved pollutants, the liquid inside the biological reactor that is now called "mixed liquor", and goes on to the hydrodynamic separation step.

In the interior of the "Hydrodynamic Separator", due to the hydraulic design of the system, approximately two thirds of the inlet flow rate is directed to the mixed liquor collector system with decanted solids, as induced by the suction flow rate of the centrifugal pump (20), and one third of the inlet flow rate in the hydrodynamic separator, which coincides with the inlet flow rate in the overall process, is directed to the decanted liquor collection system and flows by gravity into the gravitational settler (9) through the attached pipeline (10).

The flow collected by the centrifugal pump (20) is recycled to the biological reactor (2), passing through the gas dissolution system. The gas dissolution system is responsible for supplying the oxygen demanded by the aerobic microorganisms and for providing the mixing energy responsible for the maintenance of solids in suspension in the biological reactor.

The function of hydrodynamic separation is to make a separation of the solids, taking the solids concentration of the mixed liquor that follows to the gravitational sedimentation step and adding solids concentration to the mixed liquor that is captured by the sludge collection system of the Hydrodynamic Separator.

For said separation effect to occur, the hydrodynamic separator has a laminar separation system comprising laminar plates/blades (8), which reduces the turbulence in the region to Reynolds number values below 2000, transforming the regime from turbulent to laminar, and thus inducing more intense sedimentation of solids. This effect, added to a composition of drag forces applied to the particles, will result in the routing of the particles to the sludge collector (6), wherein the mass of particles passing through the spillway (7) is less than 30% of the mass of particles that enters the hydrodynamic separator (4). Consequently, the mass of solids that is collected by the sludge collector (6) will be greater than 70% of the input mass in the hydrodynamic separator (4).

The output of decanted liquid of the Hydrodynamic Separator (4) occurs by gravity, by the admission of the same in the spillway through its holes (26), which are distributed throughout the upper cross-section of the separator.

The mixed liquor with more concentrated sludge is captured by the sludge collection system of the separator through the holes (21). Said holes are present in collection tubes throughout the cross-section of the hydrodynamic separator, receiving the suction flow rate of the centrifugal pump (20), thus producing the effect of hydraulic drag in the horizontal direction, downwards, in the solid particles or biological flakes that are inside the hydrodynamic separator (4), producing the effect of hydrodynamic separation of solids.

In the biological reactor (2), the concentration of microorganisms must be kept constant at values that satisfy the rate of substrate application between 0.05 and 0.5 kg of biochemical oxygen demand per day per kg of microorganisms in suspension in the biological reactor, in order to achieve the desired removal of organic load dissolved in the effluent. The control of the concentration of microorganisms is done both by discarding the sludge of hydrodynamic separator and that of the gravitational settler.

The treated effluent is the decanted supernatant withdrawn by the decanted water disposal pipeline (17), free of dissolved organic matter absorbed in the biological reactor (2) and also free from the sedimented solids of the gravitational settler (9).

Principles of Hydrodynamic Separation

Hydrodynamic separation is governed by principles of unitary operations involving particles, or particulate systems.

The process of Hydrodynamic Separation of Solids can be described through theory on particulate systems, according to the theory of Particle-Fluid Interaction.

Figure 6:
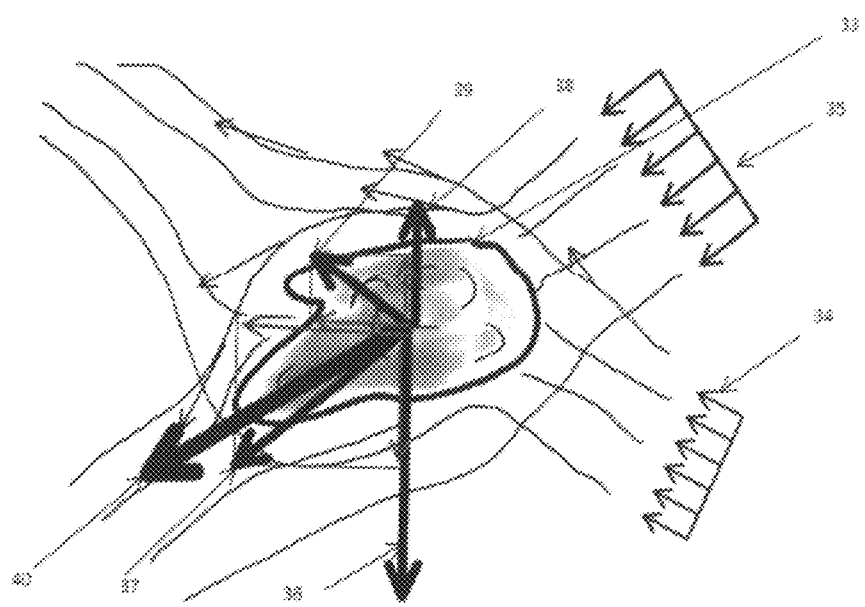
FIG. 6 is a schematic view illustrating the dynamics of the fluid-particle system occurring in the biological aerobic activated sludge process of the present Application.

The dynamics of the fluid-particle system can be observed in FIG. 6, using the nomenclature adopted as below:

(33)—Biological flake (particle).

(34)—$U\infty_{desc}$=Discharge approach speed: The supernatant flow rate of discharging of the hydrodynamic separator.

(35)—$U\infty_{suc}$=Sludge suction approach speed: The flow drawn by the hydraulic pump connected to the collector of solids of the hydrodynamic separator.

(36)—Vector of force representing the weight of the flake (ps.V.g), wherein V is the particle volume, ps the specific weight of the particle and g the acceleration of gravity.

(37)—$F_{Desc}$=Suction drag force: Given by Stokes law for the performance of sludge suction speed.

(39)—$FD_{desc}$=Disposal drag force: Given by Stokes law for the performance of discharging approach speed.

(38)—Thrust=Thrust force being E=Vp.p.g, wherein p is the liquid density.

(40)—RFD=Vector resulting from forces FDsuc, FDdesc, own weight and E. For system sizing effect, this vector is the one used for the targeting of the flake and sizing of the hydrodynamic separator.

Angle β=Angle formed by the horizontal and the suction drag force (37). It depends on the geometric characteristics of the hydrodynamic separator.

Angle α=Angle formed by the horizontal and the disposal drag force (39). This depends on the geometric characteristics of the hydrodynamic separator.

In addition to these parameters, other defined quantities are also necessary, as listed as follows, to equate the equipment:

V=volume of particle;
m=mass of particle;
ps=density of particle;
v=speed of particle;
p=density of the fluid;
μ=dynamic viscosity of the fluid;
U∞=approach speed (or undisturbed) of the fluid;
b=intensity of the external force field.

For the calculation of the drag forces, Stokes law is adopted, as follows in the equation below:

$$FD = \pi/8 * CD * \rho * D^2 * U_\infty$$

wherein p is the liquid density, D is the medium diameter of the particle and U∞ is the approach speed and CD is the drag coefficient, as follows in the equation below:

$$CD = \frac{4 * D * (\rho s - \rho) * g}{3 * \rho * v_{sed}^2}$$

wherein $v_{sed}$ is the flake sedimentation speed, obtained from the consecrated theory of biological flake sedimentation, further explained.

Usually when operating with separation of biological solids, one must take into account concepts that involve the biological condition of the sludge, whose flakes are the particles.

For this issue, in the scope of sizing of activated sludge systems, the theory of limit flow of solids is used, wherein a series of authors (White, 1976; Johnstone et al., 1979; Tuntoolavigerest & Grady, 1982; Koopman & Cadee, 1983; Pitmann, 1984; Daigger and Roper, 1985; Ekama & Marais, 1986; Wahlberg and Keinath, 1988, 1995; van Haandel et al., 1988; von Sperling, 1990; Daigger, 1995) sought to express the sedimentation speed of the sludge in function of easily determinable or assumed variables, such as the Volumetric Index of Sludge (IVL and its variants). Once the sedimentation velocity of the sludge is estimated, the limit flow theory can be used for projection and operation. The proposition of von Sperling and Fróes (1999) determines for each sedimentation range (from greatest to the worst) an average of values of $V_0$ and k, obtained by several authors, tabulated in Table 1 below.

With these coefficients, it is possible to determine the sedimentation speed, according to equation 04: $V_{sed} = V_0 \cdot e^{-k \cdot c}$ Wherein $V_{sed}$ (m·h$^{-1}$) is the final particle velocity, C is the solid concentration of the analyzed medium and $V_0$ (m·h$^{-1}$) e k (L·g$^{-1}$), parameters tabulated as a function of sludge condition. However, the parameter $V_0$ represents the particle velocity without the action of effect of the concentration of solids in the system.

The parameter $V_{sed}$ is used to define the drag coefficient CD, used in the sizing of the hydrodynamic separator of solids.

In Table 1 can be found parameters $V_0$ and k, tabulated depending on the biological condition of the biological flake.

TABLE 1

| Sedimentability | Sedimentation Velocity (m/h) $V_{sed} = V_0 \cdot e^{-k \cdot c}$ | | Limit Flow (kg/m2 · h) $G_l = m \cdot (Q_s/A)^n$ | |
| --- | --- | --- | --- | --- |
| | $V_0$ (m/h) | K (m$^3$/kg) | m | n |
| Great | 10.0 | 0.27 | 14.79 | 0.64 |
| Good | 9.0 | 0.35 | 11.77 | 0.70 |
| Medium | 8.6 | 0.50 | 8.41 | 0.72 |
| Bad | 6.2 | 0.67 | 6.26 | 0.69 |
| Very bad | 5.6 | 0.73 | 5.37 | 0.69 |

Using the above theories, it can be predicted at which point of the hydrodynamic separator the particle will touch, being dragged by the resulting detailed forces.

The hydrodynamic separator is considered well-sized when the particle that enters the separator in the most unfavorable position will touch the bottom and not the wall of the hydrodynamic separator.

Principles of the Activated Sludge Process with Hydrodynamic Separation

Table 2 below considers the sizing capacity considerations for a conventional ETE without the use of a hydrodynamic separator, as compared to another with the hydrodynamic separator operating at different solid retention rates.

In Table 2 there are parameters adopted and calculated according to the current methodology of activated sludge sizing, and calculation considerations, assuming the insertion of a hydrodynamic separator, whose solids separation yields vary from 70% to 90%.

In the first row of Table 2, there is the title indicating the solid separation efficiency of the hydrodynamic separator. The first two columns of the section "Hydrodynamic Separator Solid Retention (%)", with 0% of separation efficiency, represent the operation of activated sludge without the hydrodynamic separation of solids. In the following columns, the solids separation efficiency values were adopted with 70%, 80% and 90%. This efficiency depends on the project adopted for the separator. As a function of the separation efficiency, the increase of the treatment capacity is shown.

Below is the description of each row of the table, including an explanation of the calculations:

Row 1 (Flow rate): The unit adopted for the flow rate is $m^3/h$, wherein the values are adopted in the sense of demonstrating the function of hydrodynamic separator in the activated sludge process;

Row 2 (DBO5): Biochemical oxygen demand, whose unit adopted is $kg/m^3$ and the value adopted is constant for the whole table and represents the average value of organic load for sanitary sewage;

Row 3 (F/M): Food/Microorganism Factor, wherein the unit adopted is $kgDBO_5/kgSSV.day$ and represents the factor that determines the project of activated sludge, resulting in the determination of the required volume of biological reactor. Its equation is $F/M=(Q*DBO_5)/(VTA*SSVTA)$, where Q is the flow rate in $m^3/day$, $DBO_5$ is the organic load of the effluent in $kg/m^3$, VTA is the volume of the aeration tank in $m^3$ and SSVTA is the volatile solids in suspension in $kg/m^3$;

Row 4 (DBOrem): Represents the removal efficiency of $DBO_5$ of the activated sludge process in percentage and can be calculated, for sanitary sewage, by the formula $DBOrem=(1-(FM/3))*100\%$. Note that the removal yield depends on the F/M ratio;

Row 5 (SST Biological Reactor): The unit adopted is $kg/m^3$ and represents the concentration of total solids in suspension to be maintained in the interior of the biological reactor;

Row 6 (SST Secondary Settler): The unit is $kg/m^3$, represents the concentration of total solids passing to the gravitational settler after being detained by the hydrodynamic separator is given by the formula;

$$SSTDec=(100-Ef\cdot Rem\cdot \text{Hydrodynamic Separator}) \%*SST \text{ Biological Reactor};$$

Row 7 (Aeration Tank Volume (VTA)): The unit is $m^3$ and represents the volume of the aeration tank or biological reactor necessary to obtain the removal given as a function of the concentration of volatile solids to be kept in the same. Given by the formula $VTA=(Q*DBO_5)/(FM*SSV)$, wherein the parameters ate the same as of row 3 and for the situation $SSV=0.8*SST$;

Rows from 8 to 11 (Sedimentation coefficients): adopted for project as sludge of bad sedimentability. The coefficients of sedimentability can be obtained from Table 1;

Row 12 (Recirculation R): Sludge recirculation of the gravitational settler to the aeration tank. The unit is the percentage of the inlet flow rate in the activated sludge system, or $Qr=R*Q$, where Qr is the recirculation flow rate in $m^3/h$;

Row 13 (Permissible solids application rate ($G_L$)): The unit is $kgSST/h\cdot m^2$ and represents the solid rates in kg per

TABLE 2

| Item | | Parameter | Unit | Hydrodynamic Separator Solid Retention (%) | | | | |
|---|---|---|---|---|---|---|---|---|
| | | | | 0% | 0% | 70% | 80% | 90% |
| | | | | Without Hydrod. Sep. | With Hydro. Sep. | | | |
| 1 | | Flow rate | $m^3/h$ | 1.00 | 2.00 | 2.00 | 3.00 | 4.00 |
| 2 | | DBO5 | $Kg/m^3$ | 0.20 | 0.20 | 0.20 | 0.20 | 0.20 |
| 3 | | F/M | $d^{-1}$ | 0.30 | 0.30 | 0.30 | 0.30 | 0.30 |
| 4 | | DBOrem | % | 90.00% | 90.00% | 90.00% | 90.00% | 90.00% |
| 5 | | SST Biological Reactor | $Kg/m^3$ | 3.00 | 6.00 | 6.00 | 9.00 | 12.00 |
| 6 | | SST Secondary Decanter | $Kg/m^3$ | 3.00 | 6.00 | 1.80 | 1.80 | 1.20 |
| 7 | | Aeration Tank Volume | $m^3$ | 6.67 | 6.67 | 6.67 | 6.67 | 6.67 |
| 8 | Coefficients for bad | Initial Velocity $V_0$ | m/h | 6.20 | 6.20 | 6.20 | 6.20 | 6.20 |
| 9 | | Coefficient k | L/g | 0.67 | 0.67 | 0.67 | 0.67 | 0.67 |
| 10 | | Coefficient n | | 0.69 | 0.69 | 0.69 | 0.69 | 0.69 |
| 11 | | Coefficient m | | 6.26 | 6.26 | 6.26 | 6.26 | 6.26 |
| 12 | | Recirculation R | | 70% | 70% | 70% | 70% | 70% |
| 13 | | Adm. rate of sol. application ($G_L$) | $kgTSS/m^2 \cdot h$ | 6.79 | 1.70 | 11.82 | 11.82 | 15.60 |
| 14 | | Necessary section of sedimentation | $m^2$ | 0.75 | 12.03 | 0.52 | 0.78 | 0.52 |
| 15 | | Volume of sedimentation | $m^3$ | 2.25 | 36.09 | 1.55 | 2.33 | 1.57 |
| 16 | | Period of sedimentation | h | 2.25 | 18.04 | 0.78 | 0.78 | 0.39 | hour applied in 1 m² of secondary decantation admissible so that all the solids are sedimented avoiding the loss of the same by the supernatant. The equation used to calculate this rate is $G_L = M*(R*V_0*EXP(-k*C_0)^4 n$, wherein $C_0 = SSTA$ (kg/m³);

Row 14 (Required section of sedimentation): it represents the required section of gravitational settler to receive the solids charge from the biological reactor or hydrodynamic separator given in m² and is calculated by equation: $A = (Q+Qr)*C_0/G_L$;

Row 15 (Volume of sedimentation): It is the approximate volume of the secondary decantation unit in m³ and calculated by the sedimentation section times the average depth, the depth being adopted by 3 m;

Row 16 (Period of sedimentation): It is the average period in which the sludge remains in the gravitational settler in hours and is given by the volume of the settler divided by the input flow rate in the same.

The aim is to use Table 2, to demonstrate the increase of the capacity of treatment with the use of the activated sludge process with hydrodynamic solid separation compared to conventional activated sludge treatment.

In Table 2, the conventional activated sludge system is dimensioned for the unit capacity of 1 m³/h of effluent, with a biological reactor volume of 6.67 m³. Keeping this same tank volume of Biological Reaction, the flow rate of the treatment increases to double. To maintain the yield of 90% removal of $DBO_5$, the F/M ratio in 0.3 kgD-BO/kgSSV.day must be kept constant. Therefore, it is necessary to increase the concentration of solids.

It is observed in the conventional activated sludge process that with the increase of the concentration of solids in the biological reactor, it is necessary to increase the sedimentation section, for example, to double the flow in a conventional system having sludge conditions classified as "bad" (see the coefficients in Table 1), a secondary decantation section is required more than 20 times larger than the section required for a unit flow rate, resulting in a period of detention in the gravitational settler of around 30 hours. As the settler is an anoxic environment, it is not recommended the to keep the biological sludge in it for more than 5 hours, so it is not possible to double the flow of a conventional activated sludge system simply by physically increasing the size of the gravitational settler section.

However, in the activated sludge process with hydrodynamic solid separation of the present Application, the situation is different. To detail some situations, it is necessary to consider the efficiency of retention of solids in the hydrodynamic separator.

The flow rates established for the process operating with a hydrodynamic separator (Table 02, item 01) are of 2.00; 3.00 and 4.00 m³/h and are related to the retention efficiency values of the hydrodynamic separator.

These flow rates are the admissible flow rates that the process has, using a constant biological reactor equal to 6.67 m³ (Table 02, item 7), considering the treatment of the effluent with a charge removal efficiency of 90%.

To maintain treatment efficiency at higher flow rates than in the conventional process while keeping the same volume of the biological reactor, it is necessary to increase the concentration of biological sludge in this compartment, according to Table 2, item 5; for 6.0; 9.0; 12; 0 kgSST/m³.

If there was no action of the hydrodynamic separator, these concentrations would be those that would pass to the gravitational settler, substantially reducing the amount of permissible solids (Table 2, item 13).

However, with the application of the hydrodynamic separator, the passage of solids to the gravitational sSettler will be respectively, 1.8; 1.8 and 1.2 kgSST/m³ as respective application rates (Table 2, item 6), which are possible concentrations to be treated by the gravitational settler.

The results of the required sedimentation sections recorded in line 14 are respectively 0.52 m², 0.78 m² and 0.52 m², which are below the section required for conventional sedimentation, where conventional activated sludge is usually projected by the hydraulic application rate of 1.0 m³/m²*h.

Thus, it is theoretically demonstrated the greater capacity of treatment of activated sludge with hydrodynamic separation in relation to the conventional active sludge process.

The Activated Sludge Process with Hydrodynamic Solid Separation of the present Application operates with the significant advantages over the conventional activated sludge process.

In the conventional activated sludge process, the concentration of solids flowing to the gravitational settler is the same as that found in the biological reactor. In the process of the present Application, the concentration of solids entering the gravitational settler (9) is lower than that found in the biological reactor (2). This difference enables the increase of the sedimentation capacity, since the hydraulic application rate in a gravitational settler is inversely and exponentially proportional to the concentration of incoming solids in the settler.

With the lower loading of solids in the gravitational settler (9), it is possible to increase the hydraulic loading of the same, thus resulting in the increase in flow rate of this process compared to a conventional process.

The effect of recycling the sludge of the hydrodynamic separator in a concentration of microorganisms greater than in the biological reactor enables the cumulative factor to increase the concentration of microorganisms in the biological reactor (2).

The effects of the advantages of the above noted items combined together make it possible to increase the overall treatment capacity over conventional activated sludge processes.

The biological activated sludge process with hydrodynamic solids separation of the present Application operates with reduction of the biological mass flowing into the gravitational settler, causing only a small fraction of the aerobic biological mass to remain in an anoxic environment by the period of detention within the gravitational settler. In comparison, in the conventional activated sludge process the whole mass of microorganisms passes through the gravitational settler and stays there for the period of conventional detention. This fact allows the process of the present Application to operate with the most salable sludge, because most of the biota remains at all times in a toxic environment, giving greater stability and resistance to shocks.

The operation of the process of the present Application results in the reduction of bulking by proliferation of filamentous bacteria, since by hydrodynamic action, said bacteria are retained in the biological reactor, and prevented from passing to the gravitational settler and being lost by overflow.

In the case of death of microorganisms by acute toxicity or overload, the recovery of the process of the present Application to this system occurs in much less time, because the sludge bulking is retained by the hydrodynamic separator, greatly accelerating the recovery of the Process.

Hydrodynamic Separator Equipment

The hydrodynamic separator of solids of the present Application is equipment designed to operate in the activated sludge process with hydrodynamic separation of solids.

The hydrodynamic separator of solids can be installed inside the biological reactor of a new activated sludge treatment plant with hydrodynamic separation, as well as in a conventional activated sludge treatment plant, to turn it into activated sludge with hydrodynamic separation plant, thereby increasing its capacity or improving its pollutant removal performance. The hydrodynamic separator can be applied as one unit, or as multiple units hydraulically interconnected to operate in higher flow rate treatments.

The hydrodynamic separator of solids is the compartment, tank or equipment of the activated sludge process with the use of the hydrodynamic separator.

Figure 2:
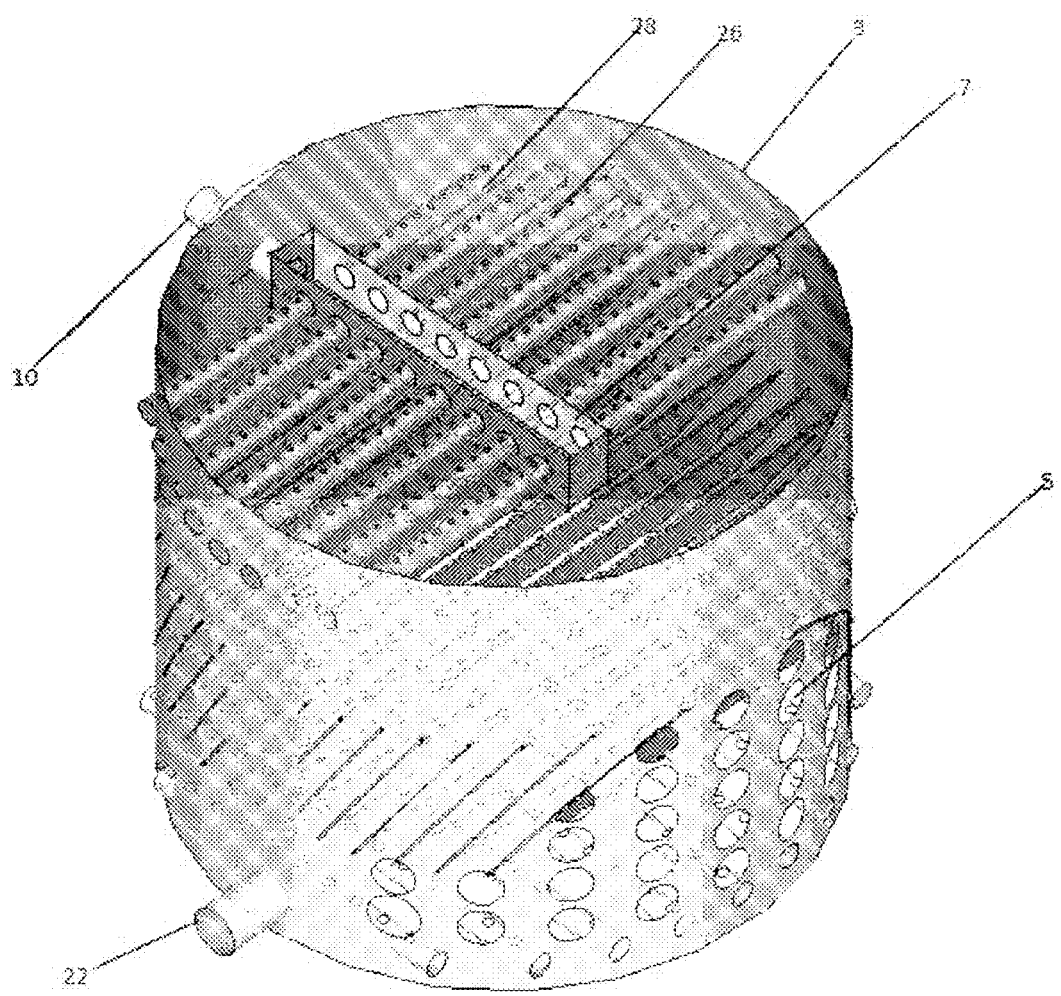
FIG. 2 is a perspective view of the hydrodynamic separator of solids.
Figure 3:
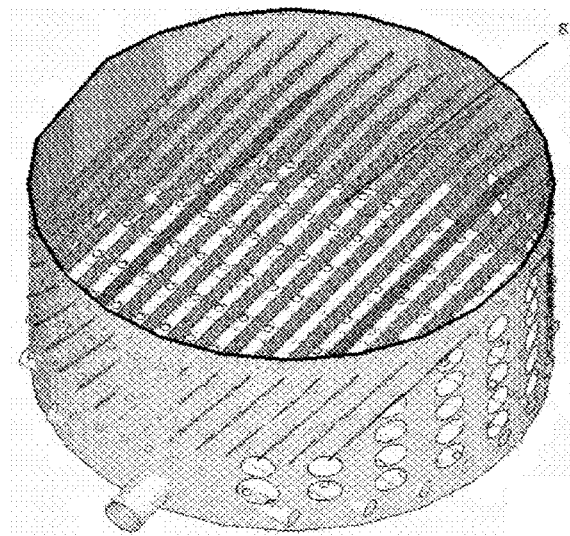
FIG. 3 is an upper sectional view of the hydrodynamic separator of solids.
Figure 4:
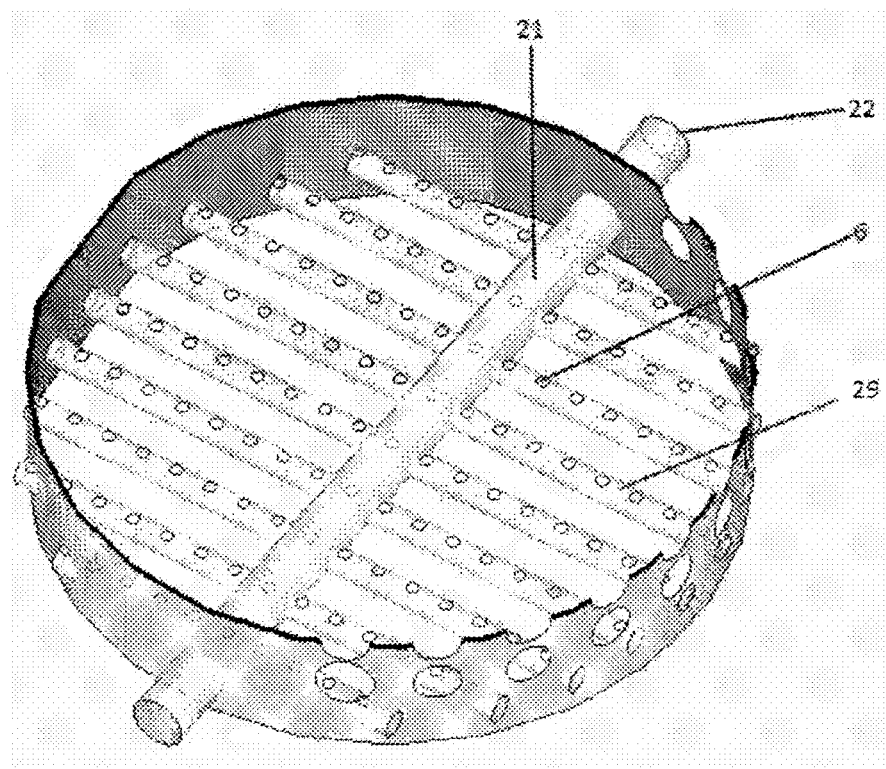
FIG. 4 is an upper cross-sectional view of the hydrodynamic separator of solids.
Figure 5:
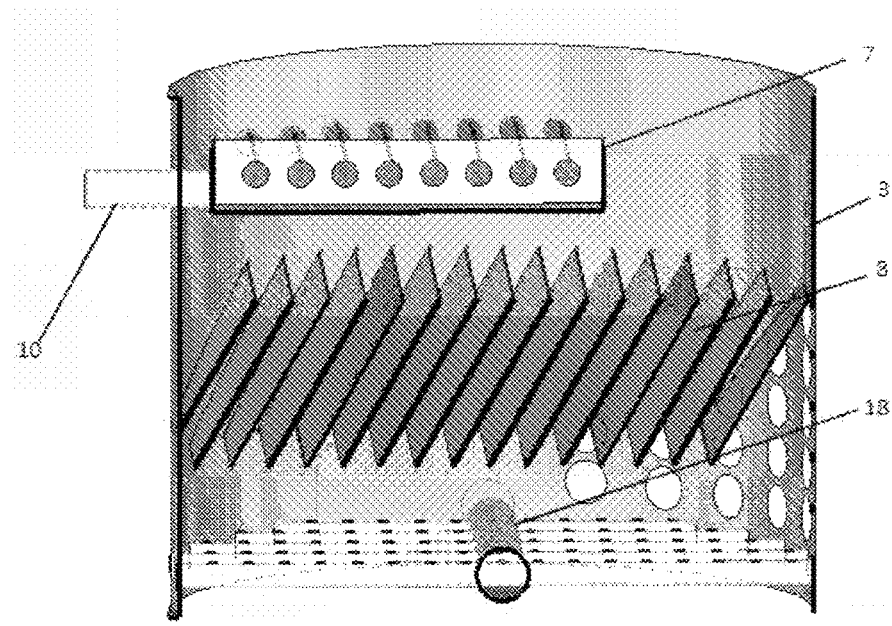
FIG. 5 is a side cross-sectional view of the hydrodynamic separator of solids.

In FIG. 2, there is a general view of the equipment of the hydrodynamic separator, and in FIGS. 3, 4 and 5 there are sections of the hydrodynamic separator of solids equipment for internal visualization.

The hydrodynamic separation is governed by principles of unitary operations involving particles, or particulate systems.

The hydrodynamic separation of solids in the activated sludge process with use of a hydrodynamic separator is intended for the retention of biological solids within the aeration tank.

The energy used for the hydrodynamic separation of solids is obtained from the aeration system, employing "jet aeration" for the dissolution of air or oxygen, simply by connecting the hydrodynamic separator sludge collector to the suction of the hydraulic pump operating in aeration/oxygenation.

The hydrodynamic separator is formed by the collector housing (3), which can be constructed of various materials such as fiberglass, steel, concrete, etc. The purpose of this housing is to delimit the working volume of hydrodynamic separation and to serve as a support for the fixation of other components of the hydrodynamic separator.

The spillway set (7) has the function of collecting the decanted effluent, with the lost solids that were not retained by the hydrodynamic separator. In the spillway box (7) are the perforated tubes for decanted effluent collection (28). These are responsible for admitting the decanted effluent and moving it forward to the main spillway box (7). In general, these tubes (28) have a diameter of 150 to 250 mm. The perforated tubes are fixed on one side to the pouring box and on the other side on the separator housing.

The holes for the collection of decanted effluent (26) are holes with a diameter of approximately 15 to 30 mm, positioned in the decanted effluent collection tubes (28).

The discharge tube pipeline (10) is responsible for the discharge of the supernatant from the hydrodynamic separator.

The set of laminar separation plates/blades (8) is used to aid in the sedimentation of the particles, since it facilitates the transformation of the hydraulic regime from turbulent to laminar by reducing the hydraulic radius in its region. The laminar separation blades comprise thin-film blades (8), fixed to the housing at a slope angle of 60° to the horizontal. The spacing between the blades is from 5 to 15 cm, and the width of the blades is from 1.0 to 1.5 m.

The system of sedimented solid collection has the function of distributing the suction flow rate through the entire section of the hydrodynamic separator, so that the particle admitted to the separator receive a flow rate in the vertical direction, downwards, generating a force whose magnitude depends on the drag coefficient of this particle in the environment in which it is. This force is the physical component that acts to increase the concentration of solids of the collected sludge in relation to the decanted effluent. It also has the function of collecting the separated solids so that they can be collected back to the biological reactor by means of hydraulic pumping.

The central tube for sedimented solid collection (21) is a 200 to 400 mm diameter tube which receives the perforated tubes (29) to conduct the liquid containing sedimented solids to the central tube.

The perforated tubes connected to the central tube (21) are tubes containing holes (6) with diameters of 25 to 50 mm, distributed equidistantly along the tube, in order to distribute the separation suction flow rate throughout the longitudinal section of the hydrodynamic separator.

The discharge tube of sedimented solids containing liquid (22) is the tube that connects to the suction of the hydraulic pump that drives the hydrodynamic separator, which is directed to the equipment for "jet aeration" which, in turn, discharges into the biological reactor.

The hydrodynamic separator works according to the theory on particulate systems.

Usually, when operating with separation of biological solids, it must be taken into account concepts that involve the biological condition of the sludge, whose flakes are the particles.

The sedimentation velocity of the flake should be used to define Stokes drag coefficient to be used in the sizing of the hydrodynamic separator of solids.

It is assumed as a hypothesis of sizing the need for particles to reach the bottom of the hydrodynamic separator. The geometric characteristics of the hydrodynamic separator.

The invention claimed is:

1. A system for biological aerobic activated sludge treatment with hydrodynamic solid separation, comprising:
   a) a biological reaction system, wherein contact of an effluent occurs with microorganisms and dissolved oxygen, and subsequent absorption and metabolization of dissolved pollutants, the biological reaction system using a biological reactor (2) comprising a container and a system for the dissolution of air or oxygen, comprising equipment for jet aeration in a liquid, the equipment for jet aeration further comprising:
      a liquid ejector (30) having at least one nozzle, that generates hydraulic turbulence by increasing velocity of the liquid per nozzle, wherein a gas is dissolved in the liquid;
      a gas ejector (23) receiving the gas and the liquid, under pressure, generating partitioning of the gas and producing gas microbubbles, the gas microbubbles subsequently being discharged into a mixed liquid present in the biological reactor (2), dissolving oxygen in the liquid via diffusion; and
      a gas generator (24) comprising an atmospheric air blower, the gas generator having an oxygen concentration greater than atmospheric concentration, or a liquid oxygen-containing cryogenic tank, wherein the oxygen is converted into gas by an atmospheric vaporizer to supply a dissolution system;
   b) a hydrodynamic solid separation system, wherein an effluent containing dissolved solids from the biological reactor (2) is transferred to and separated using a hydrodynamic solid separator device (4) installed within the biological reactor (2) and upstream of a gravitational settlor tank (9), wherein a resulting sludge is recycled to the biological reactor, the hydrodynamic solid separator device comprising:
- a collector housing (3) comprising a walled structure delimiting an interior of the hydrodynamic separator and allowing installation of at least a second system of the separator, wherein the effluent to the hydrodynamic separator from the biological reactor (2) passes through the collector housing (3), through a multiplicity of holes (5) on a side of the collector housing bordering the biological reactor;
- a decanted water liquor collector system (7) that collects a mixed decanted liquid from the hydrodynamic separator while having a minimal hydraulic dragging upon a mass of suspended solids;
- a system for collecting of mixed liquor with sedimented solids, collecting a maximum possible mass of suspended solids within the hydrodynamic separator (4), the system comprising a sludge collector (6) having a multiplicity of tubes, the tubes having a multiplicity of sludge collection holes (21) distributed throughout a cross-section of a bottom of the hydrodynamic separator (4); and
- a centrifugal hydraulic pump (200), comprising a suctioning element for suctioning the mixed liquor from the mixed liquor with sedimented solids collecting system through a first discharge pipeline (22), discharging the liquor through a second discharge pipeline (11) connected to the biological reactor (2) and passing through the system for the dissolution of air or oxygen; and
- c) a gravitational sedimentation of solids system, comprising the sedimentation of solids not separated in the hydrodynamic separator, wherein solids not separated in the hydrodynamic separator are sedimented through gravity using the gravitational settlor tank, and the sludge remaining recycled to the biological reactor, the gravitational settlor tank comprising:
  - a liquor distribution system connected to the hydrodynamic separator, comprising a tubular device (32) receiving flow from the decanted water liquor collection system through a connected pipeline (10), reducing velocity of the flow and distributing an inlet flow downwardly;
  - a bottom sludge collector comprising a sloping wall (13) having a maximum angle of 60° to an opposite wall, wherein the sludge sedimented within the sludge collector slides by gravity to a point of collection;
  - a sludge storage and pumping system, comprising a sludge storage compartment (20) interconnected to a bottom of the gravitational settler by a pipeline (14) and equipped with a centrifugal pump (15) to collect and recycle the sludge to the biological reactor, simultaneously discarding a portion of the sludge through another pipeline (18) having a flow rate controlled by a valve (19); and
  - a decanting water collection system, comprising a spillway (16) and a decanted and treated water disposal pipeline (17).

2. The system of claim 1, wherein the collector housing of system b) is of concrete, steel or fiberglass.

3. The system of claim 1, wherein the gravitational settlor further comprises a scraper system, having a bottom scraper machine scraping the sludge to a center of the gravitational settler (9) to be transferred to the sludge storage compartment (20).

4. The system of claim 1, wherein the hydrodynamic separator obtains energy for the hydrodynamic solid separation system obtained from an aeration system using a jet aeration for dissolving air or oxygen, and wherein the sludge collector of the hydrodynamic separator (4) is connected to a suction of the centrifugal hydraulic pump (200) operating the aeration.

5. The system of claim 1, wherein a concentration of microorganisms entering the gravitational settlor tank (9) is lower than the concentration of microorganisms in an interior of the biological reactor (2) due to the action of the hydrodynamic separator (4).

6. The system of claim 1, wherein the process increases a flow rate capacity of the effluent to be treated in relation to a conventional activated sludge process, as a function of the solids retention efficiency of the hydrodynamic separator.

7. A hydrodynamic separator of solids for operation in an effluent treatment station, comprising:
- a compartment or tank of an activated sludge process with the hydrodynamic separator formed by:
  - a collector housing (3);
  - a spillway box (7) for collecting a decanted effluent and waste solids not retained by the hydrodynamic separator, further comprising a spiller to which is attached a multiplicity of perforated pipes for collecting the decanted effluent (28) and conveying the decanted effluent towards the spillway box; the perforated pipes for collecting the decanted effluent (28) having a diameter of 150 to 250 mm, and the perforations upon the perforated pipes having a diameter of approximately 15 to 30 mm;
  - a discharge pipeline (10) connected to the spillway box allowing discharge of a supernatant from the hydrodynamic solid separator;
  - an assembly for collecting sedimented solids and distributing suction flow within the hydrodynamic solid separator, allowing a biological particle entering the hydrodynamic solid separator to move vertically downward;
  - a central pipe (21) for collecting sedimented solids with a diameter of 200 to 400 mm;
  - a multiplicity of perforated tubes (29) connected to the central pipe (21) having orifices (6) with diameters of 25 to 50 mm, distributed equidistantly along the central pipe to convey a liquid containing sedimented solids to the central pipe and for distributing the suction flow of the separation through an entire longitudinal section of the hydrodynamic separator; and
  - a discharge pipeline (22) for discharging the liquid from sedimented solids, connected to a centrifugal hydraulic pump (200) that actuates the hydrodynamic solid separator, a pressure of the pump directed to a jet aerator that, in turn, discharges into the biological reactor.

8. The hydrodynamic solid separator of claim 7, wherein the collector housing is of concrete, steel or fiberglass.

9. The hydrodynamic solid separator of claim 7, further comprising a centrifugal hydraulic pump (200), producing a suction dragging force operating on the biological particle as regulated by Stokes law to induce separation of solids in a vertically downwards direction.

* * * * *